(12) United States Patent
Monnie et al.

(10) Patent No.: US 8,201,187 B2
(45) Date of Patent: Jun. 12, 2012

(54) OBJECT MONITORING SYSTEM IN SHARED OBJECT SPACE

(75) Inventors: David J. Monnie, Portland, OR (US); Robert Bretl, Portland, OR (US); Michael A. Nastos, Portland, OR (US); Darrel S. Schneider, Aloha, OR (US); Bruce J. Schuchardt, Newberg, OR (US); David M. Whitlock, Portland, OR (US); Eric J. Zoerner, Portland, OR (US)

(73) Assignee: VMware, Inc., Palo Alto, CA (US)

( * ) Notice: Subject to any disclaimer, the term of this patent is extended or adjusted under 35 U.S.C. 154(b) by 1061 days.

(21) Appl. No.: 11/982,541

(22) Filed: Nov. 2, 2007

(65) Prior Publication Data

US 2008/0066081 A1 Mar. 13, 2008

Related U.S. Application Data

(63) Continuation of application No. 10/690,783, filed on Oct. 21, 2003, now abandoned.

(51) Int. Cl.
*G06F 9/44* (2006.01)
*G06F 15/167* (2006.01)

(52) U.S. Cl. .................................. 719/315; 709/214
(58) Field of Classification Search ................... 719/315
See application file for complete search history.

(56) References Cited

U.S. PATENT DOCUMENTS

| | | | |
|---|---|---|---|
| 6,247,025 B1 | 6/2001 | Bacon | |
| 6,567,905 B2 * | 5/2003 | Otis | 711/170 |
| 6,629,153 B1 * | 9/2003 | Gupta et al. | 719/316 |
| 6,681,226 B2 | 1/2004 | Bretl et al. | |
| 6,738,977 B1 | 5/2004 | Berry et al. | |
| 6,789,257 B1 * | 9/2004 | MacPhail | 719/316 |
| 6,829,769 B2 | 12/2004 | Cranston et al. | |
| 7,017,160 B2 | 3/2006 | Martin et al. | |
| 7,035,870 B2 * | 4/2006 | McGuire et al. | 707/704 |
| 7,131,120 B2 | 10/2006 | Veselov | |
| 7,143,392 B2 | 11/2006 | Li et al. | |
| 7,152,231 B1 | 12/2006 | Galluscio et al. | |
| 7,171,663 B2 | 1/2007 | Moore et al. | |
| 7,188,145 B2 | 3/2007 | Lowery et al. | |
| 7,774,312 B2 * | 8/2010 | Ngai et al. | 707/637 |
| 2001/0014905 A1 | 8/2001 | Onodera | |
| 2002/0099765 A1 * | 7/2002 | Otis | 709/203 |
| 2003/0050888 A1 * | 3/2003 | Satow et al. | 705/37 |
| 2003/0097360 A1 * | 5/2003 | McGuire et al. | 707/8 |
| 2004/0025171 A1 | 2/2004 | Barinov et al. | |
| 2004/0199828 A1 | 10/2004 | Cabezas et al. | |
| 2004/0267869 A1 * | 12/2004 | Bodin et al. | 709/200 |
| 2005/0086656 A1 | 4/2005 | Whitlock et al. | |

OTHER PUBLICATIONS

Jon Meyer & Troy Downing, "Java Virtual Machine" users manual, 1997 O'Reilly & Associates, First Edition, California, USA.
Barry Burd, "Java 2 for Dummies," user's manual, 2001 Hungry Minds, Inc., New York USA.

(Continued)

*Primary Examiner* — Andy Ho
*Assistant Examiner* — Abdou Seye

(57) ABSTRACT

The present invention relates to a system for monitoring an object space shared among plural applications. Objects stored in the shared space are registered for monitoring and the system receives data related to the registered objects that can be utilized to perform statistical analysis, for example, relating to the overall health of the applications.

36 Claims, 10 Drawing Sheets

OTHER PUBLICATIONS

Jamie Jaworski, "Java 1.1 Developer's Guide," Second Edition, Sams.net Publishing, 1997; pp. 3-10, 17-20, 90-92, 372-383, and 983-990.

Graham Glass, "Web Services Building Blocks for Distributed Systems," Prentice Hall PTR, 2002; pp. 55-70.

Silberschatz, et al, "Applied Operating System Concepts," First Edition, John Wiley & Sons, Inc., 2000; pp. 61-64, 74-77, 87-114, 507-518.

K. Mani Chandy & Leslie Lamport, "Distributed Snapshots: Determining global States of Distributed Systems," ACM Transactions on computer Systems, vol. 3, No. 1, Feb. 1985, pp. 63-75.

Carl W. Olofson & John Humphreys, "White Paper: Overcoming the Data Bottleneck to Deliver Dynamic It: GemStone's GemFire with IBM's BladeCenter," Publication of IDC Information and Data, Copyright 2005 IDC.

"Performance, Availability and Real-time Intelligence for Online Portals—Achieving this triple convergence with the GemFire Enterprise Data Fabric (EDF)," Gemfire EDF Technical White Paper, Copyright 2005 by GemStone Systems, Inc., 15 pages.

"GemFire Enterprise," Gemfire Enterprise Technical White Paper, Copyright 2007 by GemStone Systems, Inc., 26 pages.

Kim Haase, "Java™ Message Service API Tutorial"; 2002; Sun Microsystems, Inc., 278 pages.

* cited by examiner

OBJECT MONITORING SYSTEM IN SHARED OBJECT SPACE

CROSS-REFERENCE TO RELATED APPLICATIONS

This application is a continuation of U.S. patent application Ser. No. 10/690,783, filed Oct. 21,2003, now abandoned.

BACKGROUND OF THE INVENTION

The present invention relates to a system for monitoring an object space shared among plural applications.

Computer hardware and storage media can only create, store, and process binary information, i.e. information written using only two digits, "0" and "1". A compact disc, for example, has a surface subdivided into tiny sections that are either pitted (1) or not pitted (0) such that a laser can detect the presence or absence of pits. Similarly, microprocessors have inputs and outputs to which a reference voltage either is (1) or is not (0) present. (Microprocessors repeatedly measure the voltage at each input and output at regular intervals, or cycles—hence the speed of a processor is expressed in cycles per second, or "Hertz.") Accordingly, any computer program, as well as any data used in that computer program, must first be expressed in binary code for a computer to run the program or process the data.

Though binary code is conceptually simple, its use to perform computerized tasks introduces two drawbacks. First, binary code is a relatively inefficient way to express information. As a simple example, the number "100" in decimal notation is expressed as "1100100" in binary code, and therefore must at a minimum occupy seven "pits" on a compact disc and/or occupy either a single input of a processor for seven cycles (if entered serially) or seven inputs for one cycle (if entered in parallel). In technical terms, the space that a piece of information occupies, or alternatively the number of time cycles a piece of information occupies, is referred to in "bits." That is to say, the number "100" is a 7-bit number because it takes seven digits to express in binary code. The number "101" is also a 7-bit number, coded as 1100101, as is every number between "64" (1000000) and "127" (1111111).

In computer applications, binary code is even more inefficient because computerized information is, by convention, typically expressed in multiples of 8 bits, e.g. 8-bit, 16-bit, 24-bit, etc. The reason for this convention is that a computer processing or storage device has no physical way of distinguishing when one number ends and another number begins. Accordingly, the convention is to write a program that specifies the bit-rate, i.e. the number of bits that each piece of data processed in the program will occupy. If a program is written in 8-bit code, for example, every piece of data occupies eight bits, e.g. the number 0 is coded as 00000000, the number 1 is coded as 00000001, and the number 255 is coded as 11111111. In 8-bit code, therefore, every piece of data has a value between 0 and 255 and every piece of data occupies 8 bits even if it could theoretically be represented by a single bit. If a program requires that any piece of data take on a value greater than 255, the bit-rate for the program must be increased incrementally to 16-bit, 24-bit, etc. as appropriate.

A computer program operating in binary code may therefore use a tremendous amount of storage space and processor cycles, particularly when graphics are involved. For example, a photographic quality image is often coded at 24-bits for every pixel. If the image resolution is 2 million pixels, as is common with today's digital cameras, each image would occupy 48 million bits, or 4 Megabytes, where a byte is defined as 8 bits per byte (due to the convention of expressing binary code in multiples of 8 bits). Manipulating that image would similarly require 48 million cycles of processor time for each manipulation. The amount of storage space and processing time increases exponentially when manipulating video because the computer system must process and store many such images every second. In addition, there are many other computer applications that are at least as intensive as image processing. Applications of such intensity tend to slow considerably as data is "bottlenecked" in the computer system.

One way of minimizing the impact of the inefficiency of binary code has been to increase the amount of storage space and processing speed of computers. For example, personal computers sold commercially today offer up to 300 gigabytes (300 billion bytes) of hard drive storage, 4 gigabytes (4 billion bytes) of temporary memory storage, and processing speeds of over 4 gigahertz (4 billion cycles per second). Business computers, such those used in the motion picture industry are even faster and include more storage. In other words, as computer applications have demanded more storage space and processing time, the computers have become faster with higher storage capacity. Still, while these numbers are impressive, computer systems are not sufficiently fast as to eliminate all bottlenecks, and in fact, as computers become faster with more available storage, new applications are developed to take advantage of the improved technology so as to provide the need for even faster computers, even more storage space, etc.

Another way of minimizing the impact of the inefficiency of binary code is to write computer programs and applications as efficiently as possible. Thus there is always an emphasis on writing computer code that achieves its outcome in as few steps or calculations as possible. Similarly, a computer program should not be written in 24-bit code when only 8-bit code is required for the application, and the computer program may compress data when appropriate.

A second drawback of using binary code to perform computerized tasks is that it is impractical to write a computer program in binary code, particularly with complex programs. The first rudimentary computers, for example, were operated by mechanically toggling electrical switches between on and off states to enter a sequence of binary instructions. Computer programs simply specified the sequence of binary instructions to enter. This method was feasible so long as the program was no more than about a hundred instructions long. Beyond that point, programming directly in binary code became too complex, and programs too difficult to correct, or debug. Moreover, because the binary instructions were dependent upon the particular electrical circuitry of the computer processor and related hardware, the programmer was required to know in detail the particular architecture of the computer being used by the program.

To accommodate computer programs of increasing complexity, as well as to facilitate the introduction of personal computers into the marketplace, modern operating systems were developed. Early computer operating systems, such as Microsoft DOS, essentially acted as an interface with a computer's hardware so that a user could issue specific commands or instructions to the computer written in more ordinary language. The operating system would recognize the commands, and automatically issue the instructions to the computer in binary code. For example, in Microsoft DOS, entering the command "MEM" into the computer would result in the computer displaying the types and amounts of computer memory available. The person issuing the command did not need to know anything about binary code or the manner in which the command being entered produced the desired result. The user simply needed to either memorize or look up a set of commands in an instruction manual.

Further, early operating systems recognized simple programming languages, such as BASIC and FORTRAN, written in terms more intuitive than binary code. In these languages, commands such as WRITE, READ, LOOP, SET and other intuitive terms provided a means to write computer programs in a manner easily learned and perhaps more importantly, in a manner more easily readable when debugging the program. A simple computer program to calculate the area of a circle, for example, might have been written in BASIC approximately in this form:

1 10 PROGRAM 1 20 WRITE "This is a program to calculate the area of a circle." 30 WRITE "Please enter the radius of the circle" 40 READ R 50 SET A=.PI. *R{circumflex over ( )}2 60 WRITE "The area of the circle is" R 70 END In this example, after a person typed "RUN PROGRAM 1", the computer would execute the command lines in numerical sequence, whereby a person would be prompted to enter the value for a radius, defined as "R", after which the computer would square that value, multiply the squared value by pi and print out the computed area. Writing this same program in binary code not only would have required much more time and effort on the part of the programmer, but the programmer also would have had to know the technical specifications of the computer processor. Obviously, the introduction of operating systems along with intuitive programming languages was a boon to both consumers and computer programmers.

A number of such operating systems and programming languages became prevalent. For example, Apple Macintosh and Microsoft Windows operating systems improved (from a consumer's perspective) upon simple text-based operating systems such as DOS by allowing user to issue instructions to the computer using a point-and-click graphical interface displayed on a computer monitor. Computer applications, such as word processing programs, computer games, and a host of others took advantage of this functionality to provide products that could be used more intuitively through the graphical interface. Today, a host of operating systems are used, such as many versions of Microsoft Windows 9x, Macintosh OS, Linux, Windows NT, among others.

A wide variety of programming languages also became prevalent. At first, most new programming languages followed the model of the early FORTRAN language by structuring the programming language as a series of commands by which a programmer would issue instructions to a computer in a logical order. The most popular of these language types is a program called "C." The creation of "C" is considered by many to have marked the beginning of the modern age of computer languages. "C" successfully synthesized what had seemed to be conflicting attributes of several existing programming languages, adding new attributes to form a single, powerful structured language that also happened to be easy to learn. Moreover, it was a programmer's language. Prior to the development of "C", computer languages were generally designed either as academic exercises by engineers or designed by bureaucratic committees. "C", however, was developed by programmers, reflecting the way they approached the task of programming. As a result, "C" found wide and rapid acceptance in the programming community, attracting many followers who had near-religious zeal for it.

Once again, however, the increasing complexity of computer programs exposed an underlying flaw of "C" as well as its predecessors. Each of these programming languages requires that a program be written as a series of linear steps or instructions (with an occasional loop or branch thrown in). In fact, writing such a program is similar to constructing a geometric proof, and like a proof, once a program such as C or FORTRAN exceeds a certain number of steps (somewhere between 25,000 and 100,000 lines of code), the program becomes too complex write effectively.

Therefore a new approach to computer programming began to find acceptance in the programming community, commonly referred to as object-oriented programming. Object-oriented programming approaches a programming task in roughly the same way that a person's mind might approach that task—by abstracting a solution. Rather than defining a series of steps, or instructions by which a task could be accomplished, an object-oriented program focuses first on a program's data, defining classes of data and objects, where an object is a particular instance of a class. An object-oriented oriented program still contains instructions, referred to as methods, which often are embedded within the classes or objects themselves. An example of a simple object oriented program that displays the volume of two boxes might look like this:

2 class Box {double width; double height; double depth; // display volume of a box void volume ( ) {System.out.print ("Volume is"); System.out.println (width*height*depth); }} class BoxDemo {public static void main (String args[ ]{Box mybox1=new Box ( ); Box mybox2=new Box ( ); // assign values to mybox 1's variables mybox1.width=3 mybox1.height=20 mybox1.depth=15 // assign values to mybox2's variables mybox 2.width=3 mybox2.height=6 mybox2.depth=9 // display volume of mybox1 mybox1.volume ( ); // display volume of mybox2 mybox2.volume ( )

In this example program, a box class is first defined having the variables of width, height, and depth (the term "double" identifies the type of number that the variable is allowed to be). The box class also defines a method to display the volume of an object box of this class by multiplying width by height by depth. Once this class has been defined, the program defines a second class BoxDemo which includes two objects of the initial box class. The class BoxDemo then twice calls the method of the first box class for displaying the volume of a box, once to display the volume of mybox 1 and once to display the volume of mybox2.

Object oriented programming has quickly gained widespread popularity. One particularly popular object oriented language is called Java, which is the programming language used in the foregoing example (Java is a trademark of Sun Microsystems Inc.). The reason Java has become so popular is its versatility in defining classes and objects, as well as its ability for one class or object to call functions in other classes and objects as well as to reuse data in other objects simply by referencing the function or the data. In Java, therefore, it is very easy to create multiple variations of a defined class, to create new variations of an old class, and to reuse a method previously defined by one class in a new class. Parenthetically, another object oriented programming language that has become popular is C++, which expands C to include the functionality of both object oriented programming and the instruction oriented programming of C.

Java, like any other programming language relies upon an interface to convert the program to the required binary instructions. With Java, this interface is called a "Virtual Machine" (VM) because the interface behaves as if it were a computer unto itself. Every time a Java based computer application is initiated, the application initiates a VM to run the application. The Java VM will be described in much greater detail later in this specification, but several important principles will be introduced now. First, while the input to a Java VM is always the Java programming language, the output of a Java VM is customized to the particular platform, or operating system, that hosts the Java VM. In other words, every Java application must be customized to the host operating system so that the VM that it creates is capable of converting the Java programming language to the commands unique to the host operating system, which in turn issues the appropriate binary instructions to the computer.

Second, Java VMs are designed to be independent of one another. If two Java applications are running on the same computer, each application creates its own VM which is self sufficient, i.e. neither VM needs rely upon the VM of the other application. If one application should close, the other application will not be affected. This often becomes problematical, however. Recall that even with today's processors and storage devices, a computer's resources may still be strained by intensive applications. With multiple Java applications running simultaneously, each creating its own VM, system resources may be strained and slowdowns may result. In other words, there is often a trade off between the desired independence of multiple Java applications and the speed at which the applications may run.

Third, the creators of the Java VM, Sun Microsystems, emphasized uniformity of the Java VM with respect to all of the host operating systems. Thus, while the "guts" of each VM will of necessity be different across each platform, a user of a Java VM was not intended to be able to recognize any difference, seeing the same functionality regardless of the host platform. This, however, became problematical. Many operating systems offer unique features not available to other operating systems. Thus a business operating on Windows NT might desire to have a Java VM, and hence the Java application running the VM, take advantage of that unique functionality. The same would hold true for a user of a Macintosh or a Linux system, or a Windows 9x system, etc. Therefore, although Sun Microsystems's Java VM is uniform across all platforms, an industry has blossomed by which Java applications may be truly customized to a host operating system whereby the features of the host operating system are more fully exploited, and custom tailored to the particular needs of the business or person running the application.

This diversity among Java VMs tends to hinder the improvement of the Java VM and the programming language because many such improvements are tied to the particular species of Java VM upon which the improvement was developed. Many businesses may like the particular improvement, but dislike other aspects of the Java VM. In that instance, a business with its own custom or proprietary VM would have the options of buying the new VM with its perceived advantages and faults, or spend the time and resources to engineer its own VM, which it likes, to include the new improvement. Exacerbating this problem is that the new improvement may be proprietary, thus eliminating the second option.

What is desired then, is an improved system for implementing object-oriented computer applications that both efficiently allocates computer hardware resources among multiple computer applications running simultaneously on the same computer or network of computers, or among multiple threads of a single computer application running on a computer or network of computers, while also preserving the independence of multiple, simultaneous applications. What is further desired is such an improved system that is sufficiently flexible so as to be compatible not only with the diverse range of existing object-oriented computer applications, but also with object-oriented applications that are developed or modified in the future.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
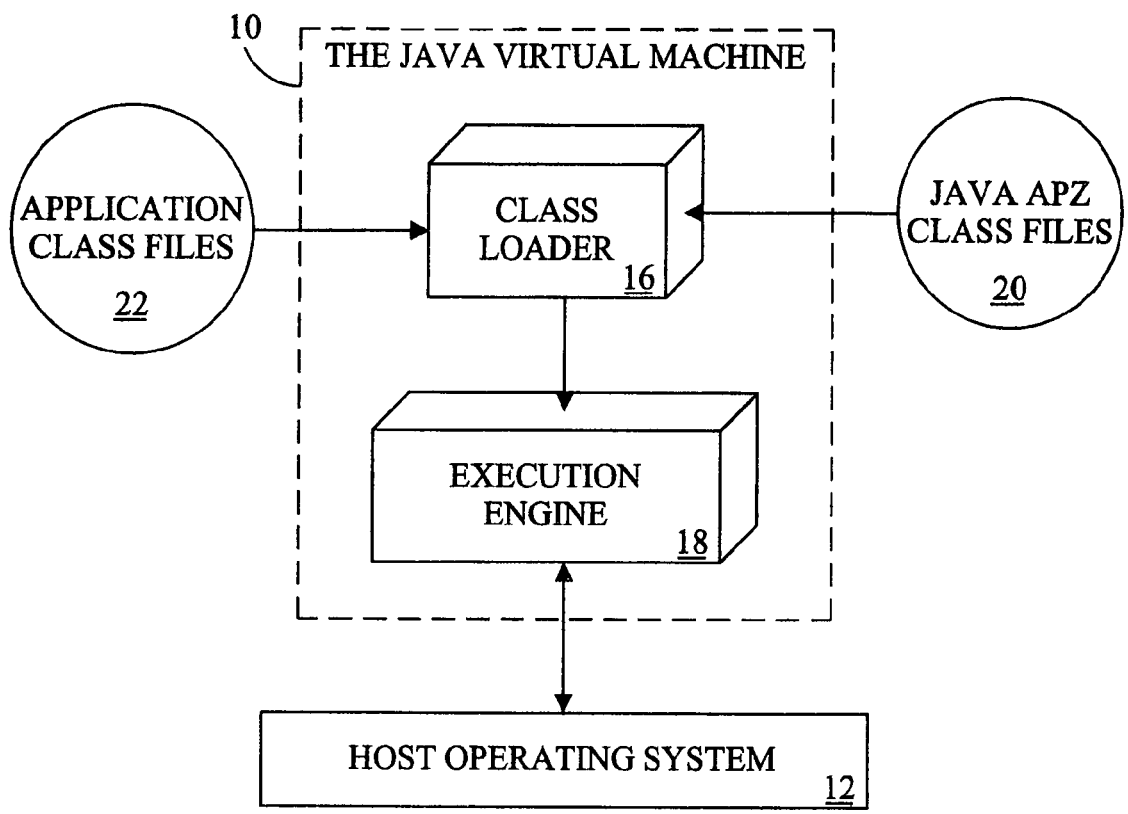
FIG. 1 is a simplified architectural schematic of an existing VM.

FIGS. 1-4B show a simplified architectural schematic of an existing virtual machine (VM) 10 as defined by Lindholm, Tim and Yellin, Frank (1999). THE JAVA VIRTUAL MACHINE SPECIFICATION, SECOND EDITION. Reading, Mass: Addison-Wesley. known as a JAVA virtual machine or Java VM, although it should be understood that other types of VMs besides Java may also have the features shown in FIGS. 1-4B. Referring specifically to FIG. 1, when a Java application is initiated on a host computer with a host operating system 12, the Java virtual machine (VM) 10 loads the application which may include a class loader 16 and an execution engine 18. Although FIG. 1 indicates a single class loader, in actuality, a Java VM may include multiple class loaders. Thus the class loader 16 may be considered a subsystem that may involve many class loaders. The Java VM 10 has a flexible class loader architecture that enables a Java application to load classes in custom ways.

Specifically, the class loader 16 may comprise a system class loader and one or more user-defined class loaders. The system class loader is a part of the Java VM implementation and loads classes, including the Java application programming interface (API) class files 20, in some default way and usually from the local disk of the host computer. As previously stated, the particular default manner in which the system class loader loads classes is specific to the particular VM implementation being used and may be customized. The term "system class loader" is sometimes referred to as a "primordial class loader", a "bootstrap class loader", or a "default class loader."

At run time, a Java application may also load application class files 22 in custom ways through user-defined class loaders, such as by downloading class files across a network. While the system class loader is an intrinsic part of the VM implementation, the user-defined class loaders are not. Instead, user-defined class loaders are written in Java, compiled to class files, loaded into the virtual machine, and instantiated just like any other object, becoming a part of the executable code of a running Java application. User defined class loaders enable a programmer to dynamically extend a Java application at run time. As the application runs, it can determine what extra classes are needed and load them through one or more user-defined class loaders. Because the user defined class loaders are written in Java, classes can be loaded in any manner expressible in the Java programming language.

For each class loaded by the virtual machine 10, the virtual machine 10 records which class loader loaded the class. When a loaded class refers to another class, the virtual machine 10 requests the referenced class from the same class loader that originally loaded the referencing class. For example, if the virtual machine 10 loads the class "Volcano" through a particular class loader, it will attempt to load any classes to which Volcano referred with the same class loader. In this way, Java's architecture enables a programmer to create multiple "name spaces" inside a single Java application. Each class loader in the executing Java application has its own name space, which is populated by the names of all the classes it has loaded.

The execution engine 18 executes instructions contained in the methods of loaded classes in "bytecode", essentially Java's machine language. The Java specification describes what is to result from a given instruction retrieved from a Java method, but a programmer of a Java application determines the best way of achieving the result using software, hardware, or a combination of both. The execution engine 18 is an abstraction; Java is a programming language capable of simultaneously running multiple threads, i.e. distinct paths of execution, hence the execution of each thread can be considered an "instance" of the abstract execution engine 18. Thus at any given time, there may be multiple "instances" of the execution engine 18.

The execution engine 18 receives a bytecode stream of instructions in a thread and executes the thread one instruction at a time. The execution engine 18 executes the actions requested by each thread, and whenever intended by the Java application, sends instructions to the operating system in the code that the operating system recognizes. From time to time, the execution engine 18 might encounter an instruction that requests a method written in some other language than Java, referred to as a "native method." On such occasions, the execution engine 18 will attempt to invoke that native method by accessing native method libraries 36 through a native method interface 34 (shown in FIG. 2). When the native method returns, the execution engine 18 will continue executing the next instruction in the bytecode stream.

When the Java virtual machine 10 runs an application, it needs memory to store many items, including information it extracts from class files, objects that the program instantiates, parameters to methods, return values, local variables, and intermediate results of computations. The Java VM 10 organizes the memory it needs to execute a program into several runtime data areas, depicted in FIG. 2. These runtime areas may include a method area 24, a heap 26, one or more Java stacks 28, one or more program counter (PC) registers 30, and one or more native method stacks 32. Although the same runtime data areas exist in some form in every Java VM implementation, the structural details of these areas are left to the designers of the VM and may therefore vary considerably from one Java application to another.

Each instance of a Java VM 10 has one method area 24 and one heap 26. These areas are shared by all threads running inside the VM 10. As each thread comes into existence, it receives its own PC register 30 and Java stack 28. When the VM 10 runs a method contained in a thread, several things happen. First, the value of the PC register is used to tell the next instruction in the method's sequence to execute. Second, the thread's java stack 28 stores the state of each executing Java method in a stack frame, which includes the thread's local variables, the parameters with which it was invoked, its return value if any, and intermediate calculations. When the VM 10 has invoked a method in a thread and that method subsequently completes, the VM 10 discards the stack frame for that method from the Java stack 28. The state of native method invocations is stored in the native method stack 32 in a manner dictated by the designer of the Java VM 10.

Information about loaded data types are parsed from class files as they are loaded and stored in the method area 24. A data type refers to the format in which the data is expressed, e.g. an integer, a float, etc. A data type could also be an address of an op code within a method or a reference to an object on the heap 26. The VM 10 uses the type information stored in the method area 24 as it executes the application it is running.

For each data type the VM 10 loads, it should store the following kinds of information in the method area: (1) the fully qualified name of the type; (2) the fully qualified name of the type's superclass; (3) whether or not the type is a class or an interface; (4) the type's modifiers; (5) an ordered list of the fully qualified names of any direct superinterfaces; (6) the constant pool for the type; (7) field information; (8) method information; (9) all class variables declared in the type except constants; (10) a reference to class CLASSLOADER; and (11) a reference to class CLASS. Each of these kinds of information is well known to those in the art who design Java virtual machines and program in Java.

Figure 3:
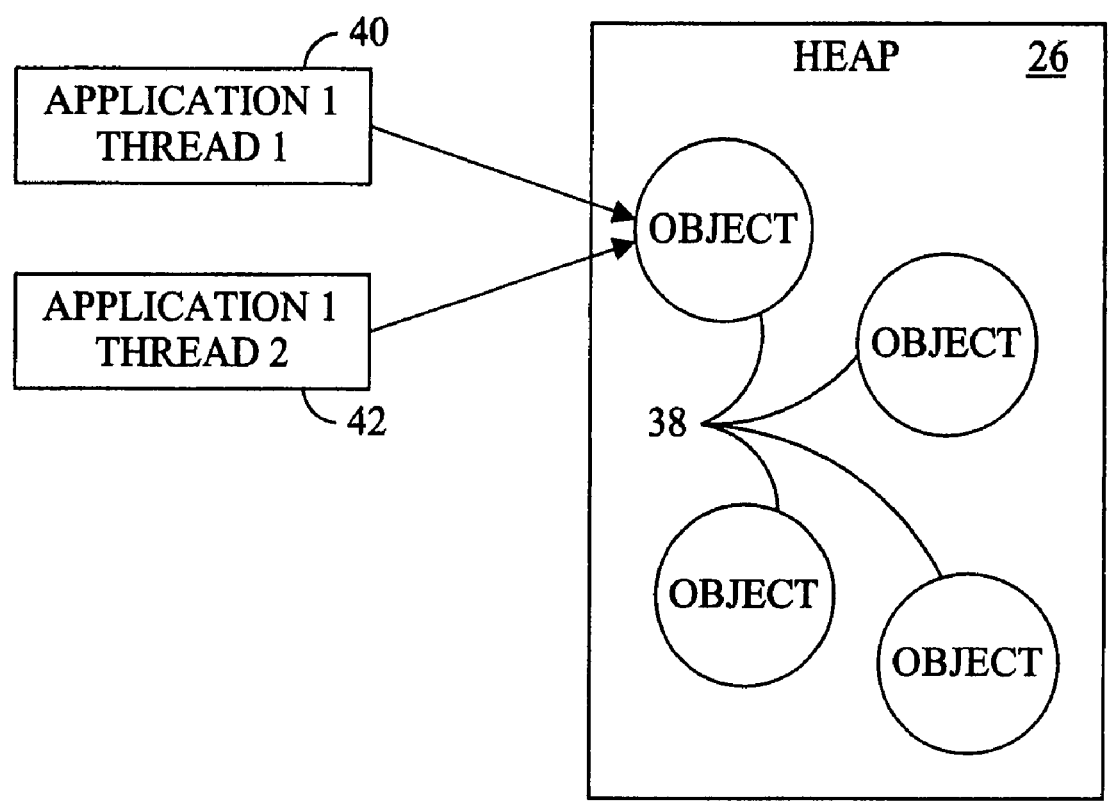
FIG. 3 is a schematic of the heap shown in FIG. 2.

Referring to FIG. 3, whenever an object 38 is created by a Java application, memory for the new object 38 is stored in the heap 26. Because there is only one heap 26 inside of any instance of a Java VM 10, all threads share the heap 26 and because each Java application runs inside its own Java VM 10, there is a separate heap 26 for every Java application running. In this manner, one Java application cannot affect the objects 38 in the heap 26 of another application. Two different threads 40 and 42 of the same application, however, could affect each other's heap data, i.e. the objects 38. For this reason, synchronization of the access to objects of multiple threads must be planned.

Figure 2:
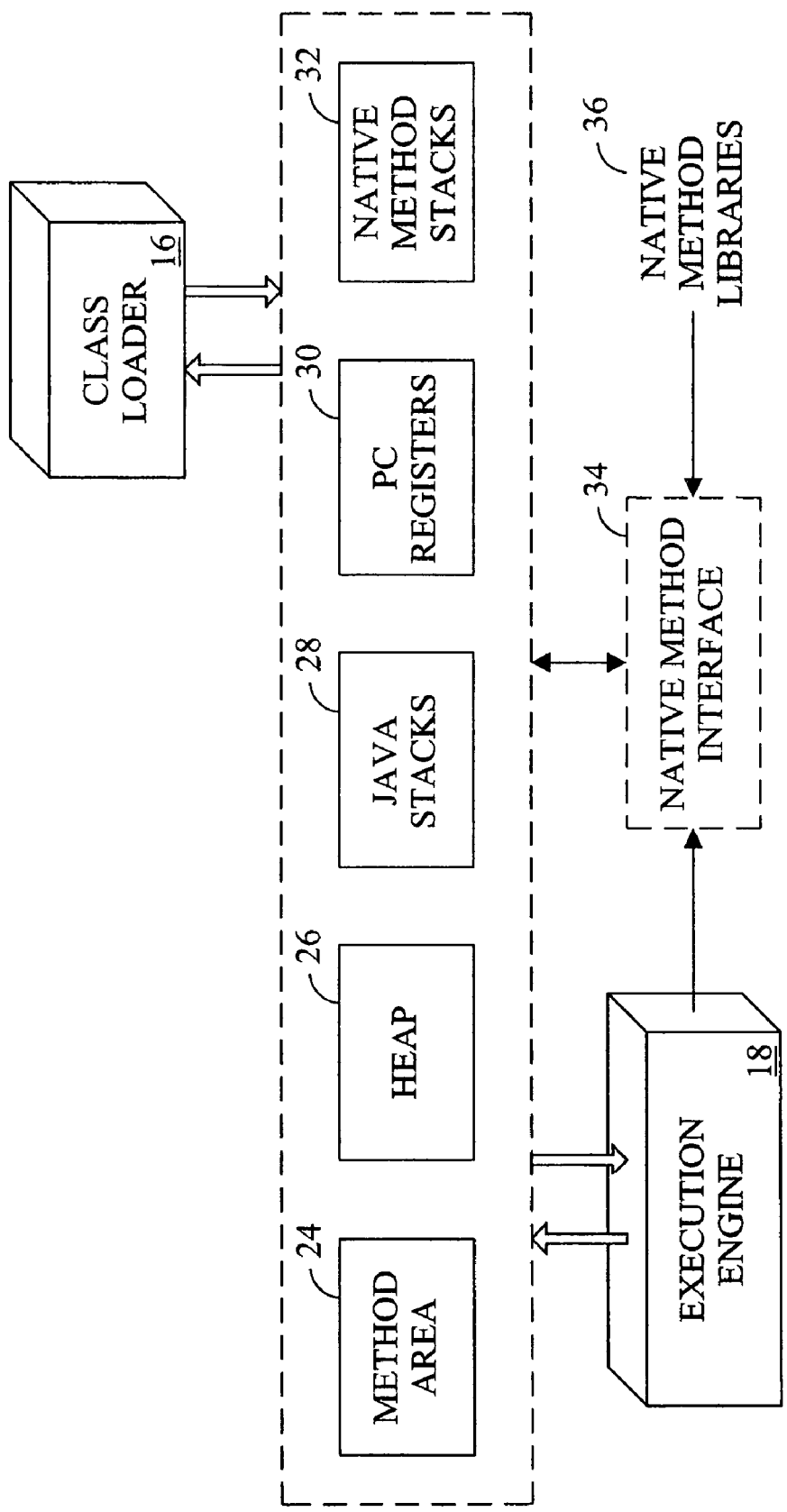
FIG. 2 is an expanded architectural schematic of the VM of FIG. 1 showing a memory region interposed between the class loader and the execution engine.
Figure 4A:
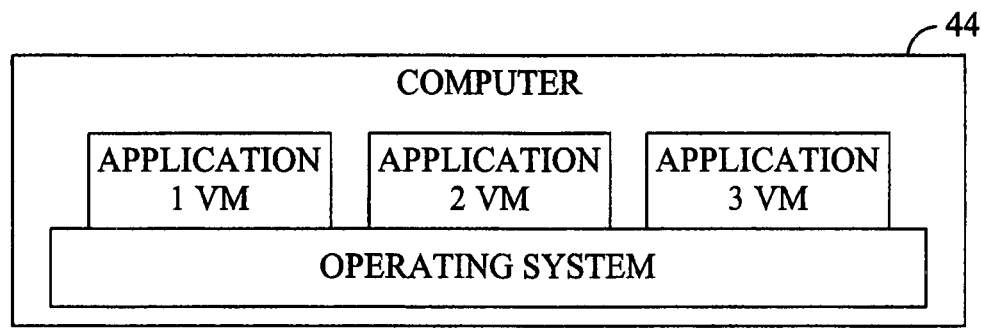
FIG. 4A is a diagram showing a prior art system for operating multiple VM applications on a host computer.
Figure 4B:
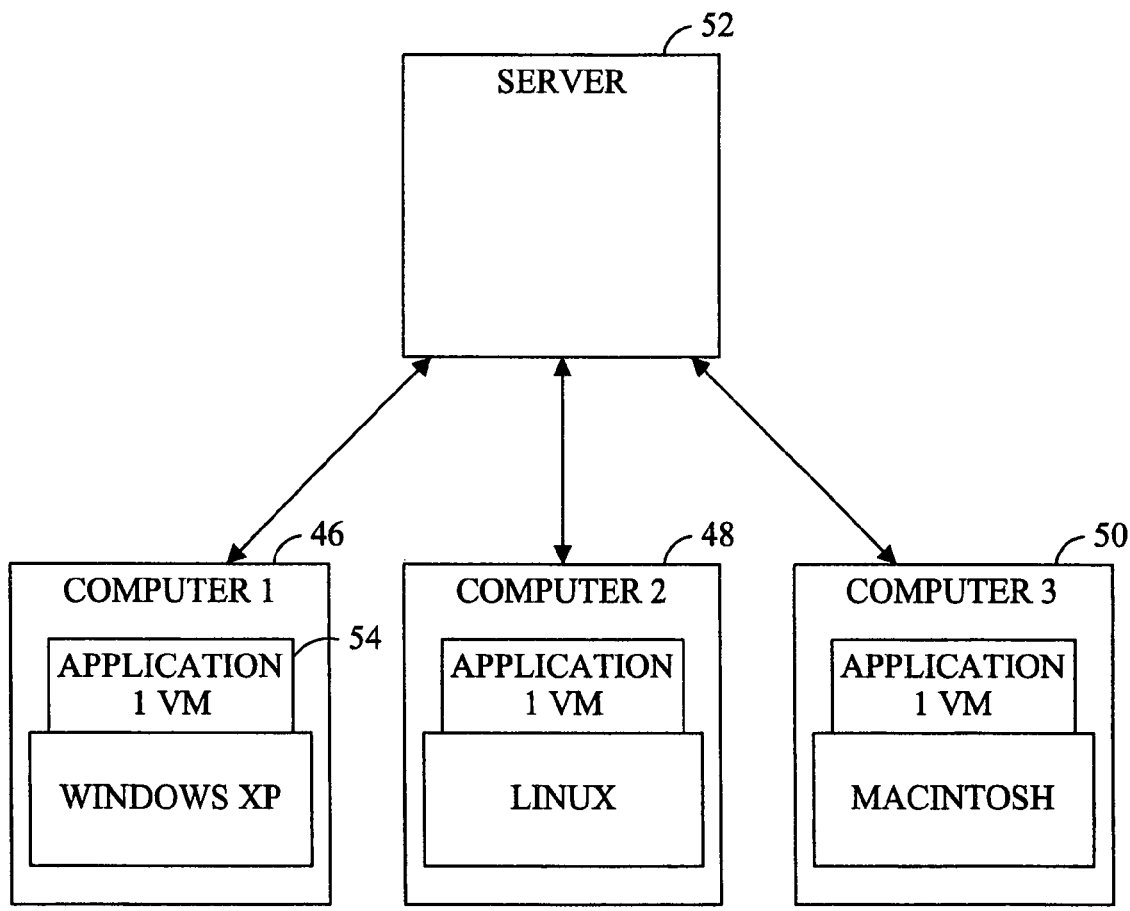
FIG. 4B is a diagram showing a prior art system for the simultaneous operation of multiple instances of a VM application on several host computers connected through a network or internet server.

The existing Java VM 10, as illustrated in FIGS. 1-3 has several disadvantages. First, it is inherently redundant. Referring to FIGS. 4A and 4B, a single computer when running multiple Java applications (or other applications that run in a VM) must create a separate VM for each application. Each VM, in turn, generates its own method area, heap, PC register, etc., using a good deal of the resources of the underlying computer. This is true even when each VM is running a separate instance of the same application where many of the objects created by the application will be identical. This is illustrated in FIG. 4B where three computers 46, 48, and 50 are running the same application 54 through a server 52. In this instance, many of the runtime data areas may be located on the server 52, creating the same kind of redundancy as seen in FIG. 4A.

The redundancy of existing VM systems translates to a loss in system speed for two reasons. First, each VM must use its own resources, i.e. time, to load objects already loaded in other applications. Second, the combined memory space of all VM applications often bottlenecks system resources. In many cases, the speed at which an application or series of simultaneously running applications may operate defines the upper limit of a system's performance—the number of trades processed, web pages served, or billing records updated per second. In other words, the speed at which individually well-tuned processes can operate determines how much value that system can provide on a second-to second basis, i.e. lost system speed means lost revenue.

The existing wisdom is that the redundancy and the associated loss of speed that results from designing every VM application to run in its own isolated VM 10 is a small price in exchange for the assurance that one application cannot change or otherwise corrupt the data being used by another application. In addition, the isolation of applications each within its separate VM ensures that if one application should close, or suddenly crash, the other applications would remain unaffected. The present inventors, though, came to the realization that there are a variety of applications in which the sharing of data across applications might actually be beneficial. In those instances, the redundancy of the existing system for running VM applications and the associated loss of system speed would be needless.

Figure 5:
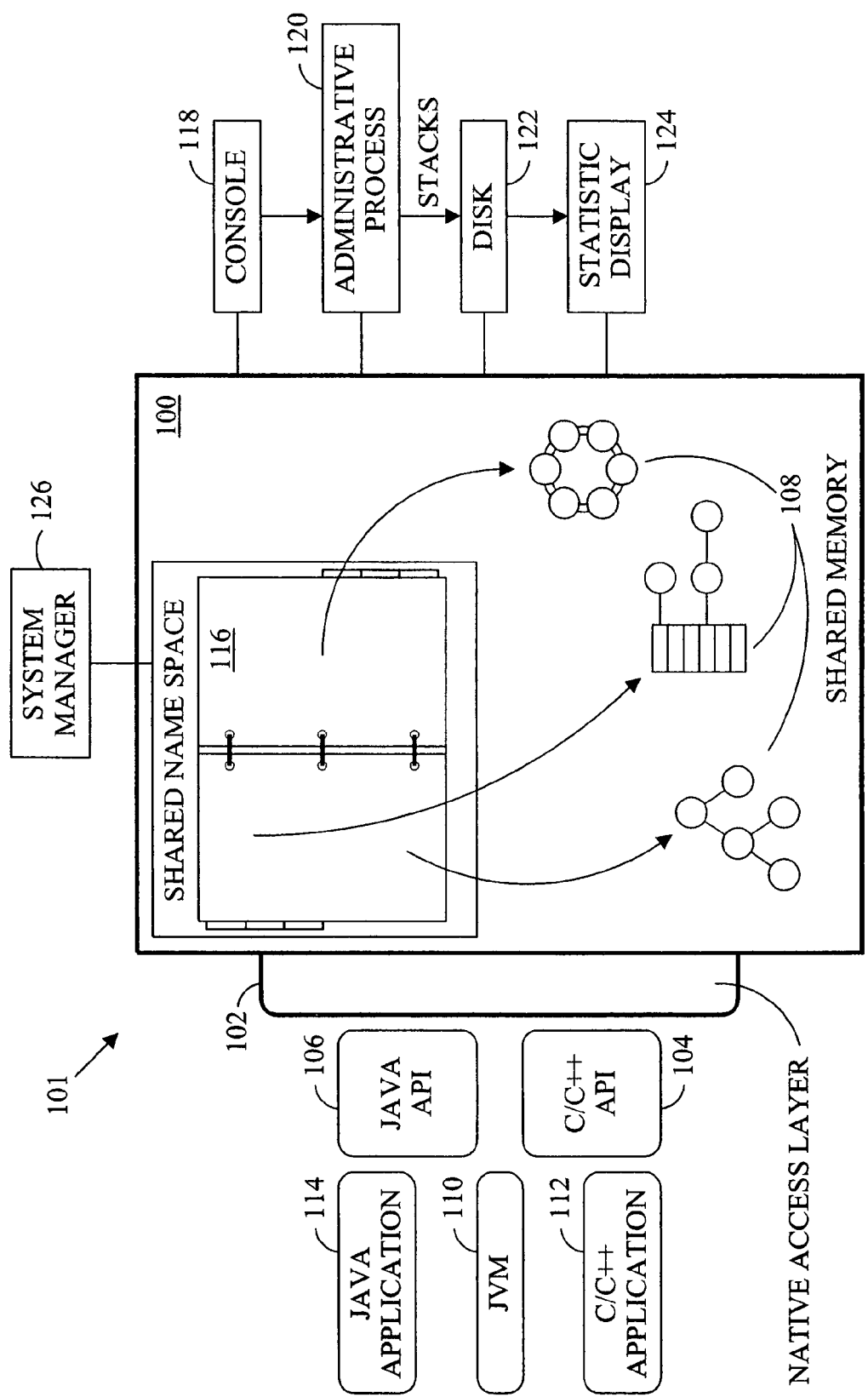
FIG. 5 is a diagram showing a first improved system for operating multiple VM applications on a host computer.

With this in mind, FIG. 5 shows an improved system for running VM applications, which broadly stated may comprise a shared object space 100 and a native access layer 102 operably connectable with a plurality of application programming interfaces (API) 104, 106 of independent VMs or other applications such as the C/C++ application 112. The access layer 102 permits each application 112, 114, through its associated, API 104, 106 to load objects 108 into the shared object space 100 where the objects 108 may be read and/or modified by the particular applications 112, 114. Although in some instances, the individual applications may duplicate some of the objects 108 stored in the shared object space 100 within its own respective heap or other memory area, the shared object space 100 permits an application to store an object 108 in the shared object space 100 instead of its own heap or other memory area, thus avoiding the redundancy of existing VM systems. Access to the objects 108 in the shared object space 100 may be synchronized using the methods that presently exist for controlling access to shared objects in a heap by multiple concurrently running threads. Further, the shared object space 100 will store an object 108 so long as a thread of any connected application is using the object 108. In this manner, even if the application that placed a particular object in the shared object space 100 closes or crashes, that object will still be available to other applications as necessary. Thus the shared object space 100 permits multiple applications running simultaneously on a system or network to enjoy the stability of existing VM systems, while providing a substantial boost in performance.

The shared object space 100 is accessible to an application through the native access layer 102. Thus a Java application or other object oriented application will recognize the shared object space 100 as simply another native method accessible through the interface that already exists in Java and other object-oriented applications. Once accessed, all the functionality of the shared object space 100 will be instantly accessible to the connected application. Further, the shared object space 100 does not need to be tied to a particular VM, but instead is backwards compatible with any individual VM, whether it is a standard Java VM provided by Sun Microsystems or a customized VM of a particular business, and forwards compatible with any VM including improvements that have yet to be developed. Thus the versatility of the shared object space 100 can not be overstated. The versatility of the shared object space 100 is furthered by its compatibility with a wide variety of application interfaces. As can be seen in FIG. 5, the native access layer 102 provides access to the shared object space 100 by both Java applications and C or C++ applications. It should be understood that these examples are illustrative only, and that the native access layer 102 could provide access to the shared object space 100 by a number of other application types, whether object-oriented like Java or command oriented like C or C++.

The advantages of the shared object space 100 are readily apparent, particularly with respect to applications that benefit from the ability of multiple, simultaneously running applications to update a shared object rather than simply read or copy a shared object. One such application might be online trading. As the popularity of online trading increases, trading exchanges are faced with ever-growing volumes of market data and concurrent trader activity. Systems that were built to handle moderate volumes now have to handle thousands of traders and billions of dollars in daily transactions. Such systems have to accommodate huge spikes in demand. For instance, a single trade may require thousands of traders to be notified. Many traders watch for these price changes, then jump in to sell or buy very quickly, causing even more notification demand and more trading volume. The faster a trading system reacts to changes, the more transactions an exchange can execute, increasing its commissions while maximizing trader satisfaction with the service.

Another example of the utility of the shared object space 100 might be its potential in improving speed of computerized activity in the telecommunications industry. Modem telecommunication networks have to process vast amounts of data very quickly. Every time a call is placed, for example, an application needs to access the customer's subscription information, apply any special discounts that may be applicable, monitor the call duration and establish a rate based on the time and distance to the terminating number. Given that the number of such calls can run into the thousands at any given moment, a memory based data sharing facility is a necessity. In the past, such telecommunications applications have been written from scratch in C at enormous expense. The availability of an off-the-shelf shared memory component that provides a shared object space 100 makes it possible to write such systems in Java or another object-oriented program more quickly, cheaply, and with less risk.

Yet another example of the utility of the shared object space 100 is its potential use in large scale internet applications. Large internet content syndication and portal applications depend on fast caching for scalability. The shared object space 100 provides an ideal caching facility for HTML and XML fragments, XML DOMs and streams, HTTP session information, and JDBC query results. It can also hold very fast page request queues and other operational data structures. The shared object space 100 may include multi-language support which may be exploited when connected to web servers, servlet engines, content management suites, and XML transcoders to speed up every phase of a sites operation.

In use, the shared object space 100 may be one element in a larger computing system 101. Specifically, it is anticipated that the shared object space 100, along with its associated native access layer 102 may be used in conjunction with a console 118, an administrative processor 120, disk storage 122 and a display 124 suitable for displaying system statistics. The console 118 is used to configure and start the system 101 which may comprise a system manager 126, the shared object space 100, and the native access layer 102. The system manager 126 creates and initializes the shared object space 100, collects garbage, gathers statistics, and logs both system and user-defined events. Once the system 101 has been started, the system manager 126 can also be used to browse the shared object space 100, enable statistics collection from individual objects, and display the statistics graphically for analysis.

The system 101 is preferably stored on a disk 122 in a default directory, e.g. "defaultSystem", that holds the system's configuration file and log file. The system 101 may be included on an executable storage media such as a compact disk that include an installation tool that may be used to create the requisite directories on the disk 122. Additional custom system directories may also be installed on the same disk 122 as desired. Preferably, the system 101 includes a number of default tools that operate on the default system; however the console 118 and a command line utility may allow the user to specify a different system.

To make use of the system 101 and its shared object space 100, the system 101 includes a library file in the default directory. Java applications should include a reference to this library (e.g. productdir/lib/gemfirejar) on its CLASSPATH. On Windows systems, the library may be made available by adding productDir/bin to PATH and on Solaris, the library can be made available by adding productDir/lib to LD_LIBRARY_PATH. An application process connects to the system 101 by making a call that contacts the system manager 126, such as
GemFireConnection.myConn=GemFireConnection.getinstance ("Gemfire"). The system manager 126 then returns information that enables the application process to map the shared object space 100 into its address space.

Each system 101 preferably maintains a global name space 116 in the shared object space 100. The name space 116 provides a fast object registry in which applications can register and look up "root" objects by name. Objects that are referenced from this name space are protected from garbage collection. Once connected to the system 101, an application can look up shared objects in the name space 116 with a command such as
3 Stock myStock=(Stock) myConn.lookup("GSI")

A shared object like myStock always represents a current shared value; that is all threads in all VMs always see the same field values, just as all threads in a single VM see the same volatile field values for an object in that VM.
The statement
myStock.getPrice( )
for example, might return the price most recently set by a local or remote thread, while the statement
myStock.setPrice(34)
immediately updates the shared view of myStock's price.
Because these fetches and updates incur no disk or network overhead, they are much faster than the same operations implemented through mechanisms like RMI and they outperform JDBC calls by an even wider margin.

The system 101 may include a Class Enhance tool that prepares an application class for sharing by modifying the class's bytecodes to provide transparent instantiation in shared memory and automatic read-through and write-through for field access methods. By default, all fields may be shared, but a user may establish more selective policies by providing an XML description of the fields to be shared in each domain class. Once a class in enhanced, making an object of that class automatically puts the object into shared memory.

Figure 6:
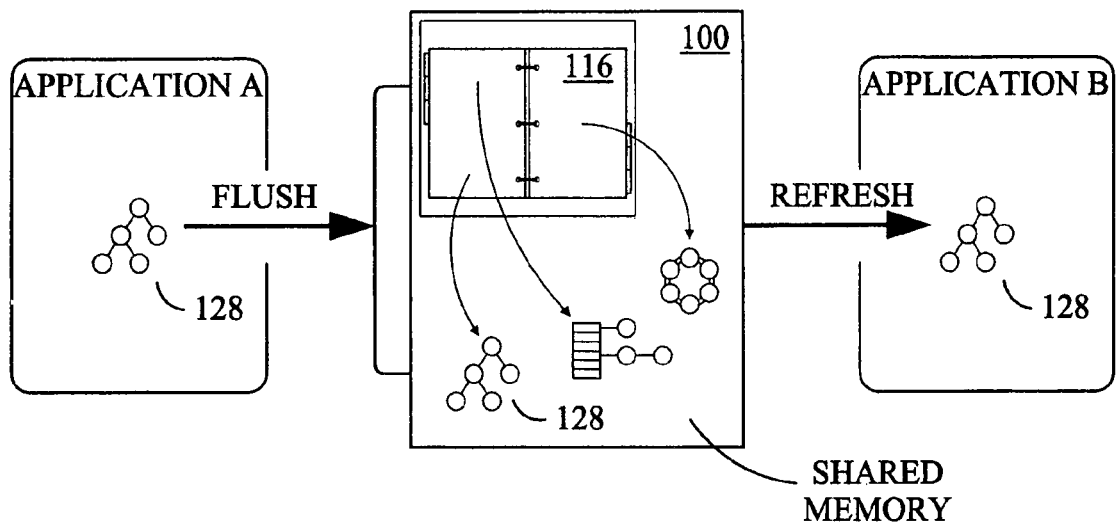
FIG. 6 is a diagram showing a first manner in which objects may be shared between applications using the system of FIG. 5
Figure 7:
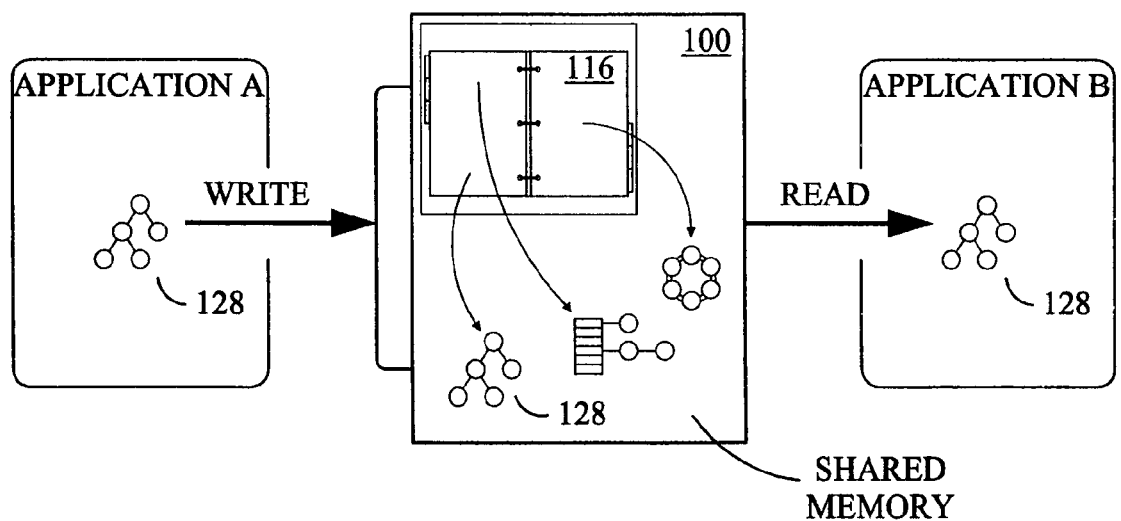
FIG. 7 is a diagram showing a second manner in which objects may be shared between applications using the system of FIG. 5

Referring to FIGS. 6 and 7, the system 101 may support two methods of sharing objects, copy sharing and direct sharing. An object 128 that is copy shared is allocated twice, once in the local memory of an application and again in shared memory 100. FIG. 6 shows an example of a copy sharing method where application A creates an object 128 in its local address space. The object 128 is shared by putting it into the shared name space 116. At this point, the object 128 is not immediately written to a field in the shared object space 100; instead the object 128 is written to shared memory 100 only after a user "flushes", i.e. updates the object to a new version, for the first time. Once an object 128 is written to shared memory, application B is able to copy the object 128 to its local memory by accessing the shared object 128 by name in the shared name space 116. Application B may modify the copy of the object 128 obtained from shared memory, but may not update the shared version of the object 128. If application B wishes to see the most recently updated version of the object 128, a refresh command may be used.

FIG. 7 shows an example of a direct sharing method, which is a one-space model where some of all of the non-static fields of the shared object 128 reside only in shared memory. Static fields may be kept in the local heap of an application's VM for performance reasons. An assignment to a field of a directly shared object 128 is immediately visible to threads of other applications and each application is able to write to the shared object. When the field is read, the current state in shared memory 100 is returned; there is no need to refresh the local memory.

Figure 8:
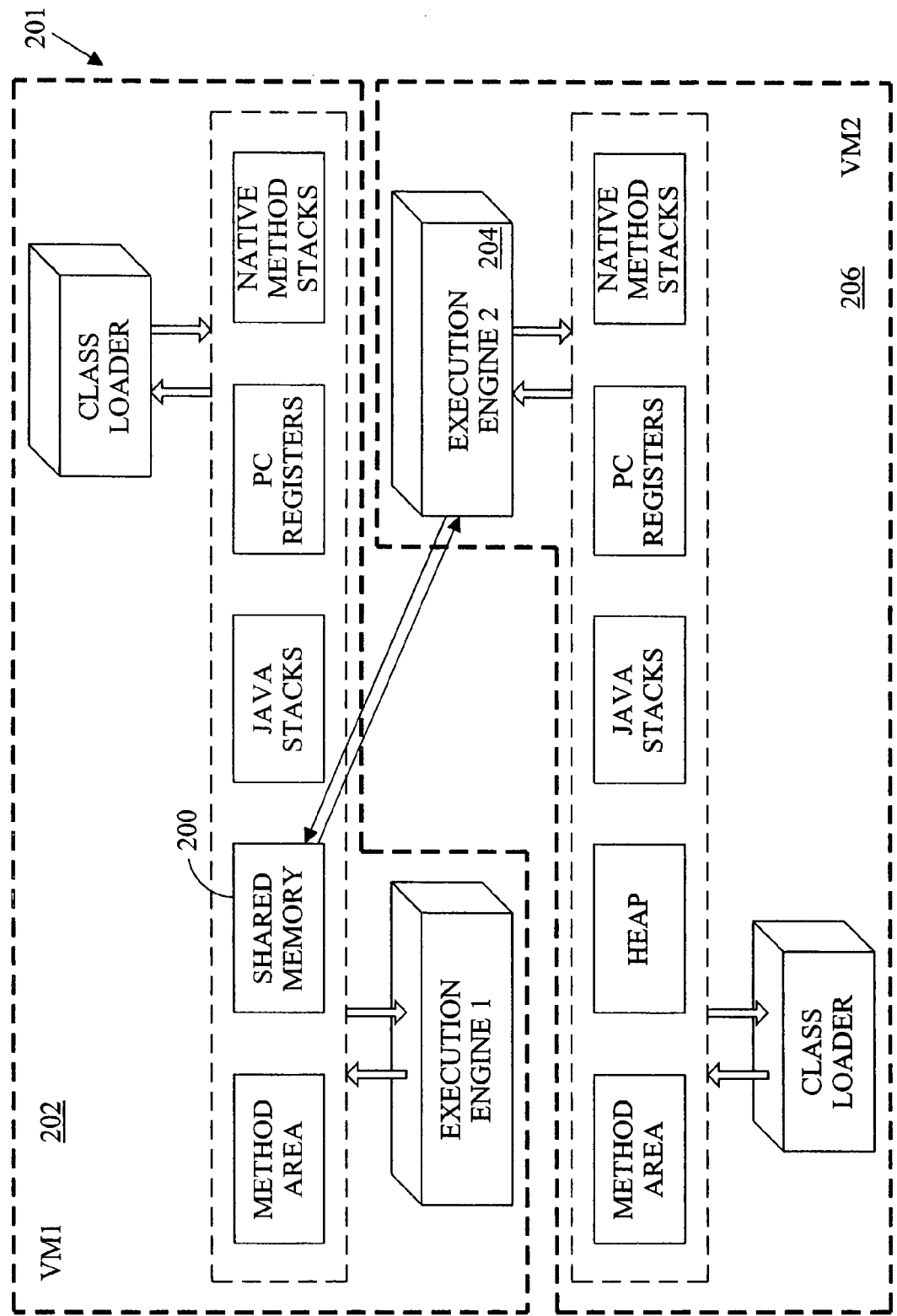
FIG. 8 is a second improved system for operating multiple VM applications on a host computer.

FIG. 8 shows another system 201 that includes a shared object space 200 within a first Java VM 202. The first Java VM 202 may include all the elements of a typical Java VM as previously described, i.e. a method area, a class loader, an execution engine, etc. The heap of the first Java VM, however, acts as the shared object space 200 so as to be accessible by the execution engine 204 of a second Java VM. In the system 201, the first instance of an application may initiate a VM whose heap performs as a shared object space for subsequent instances of applications operating on the same computer. The shared object space 200 may have all the functionality of the shared object space 100 previously described.

Figure 9:
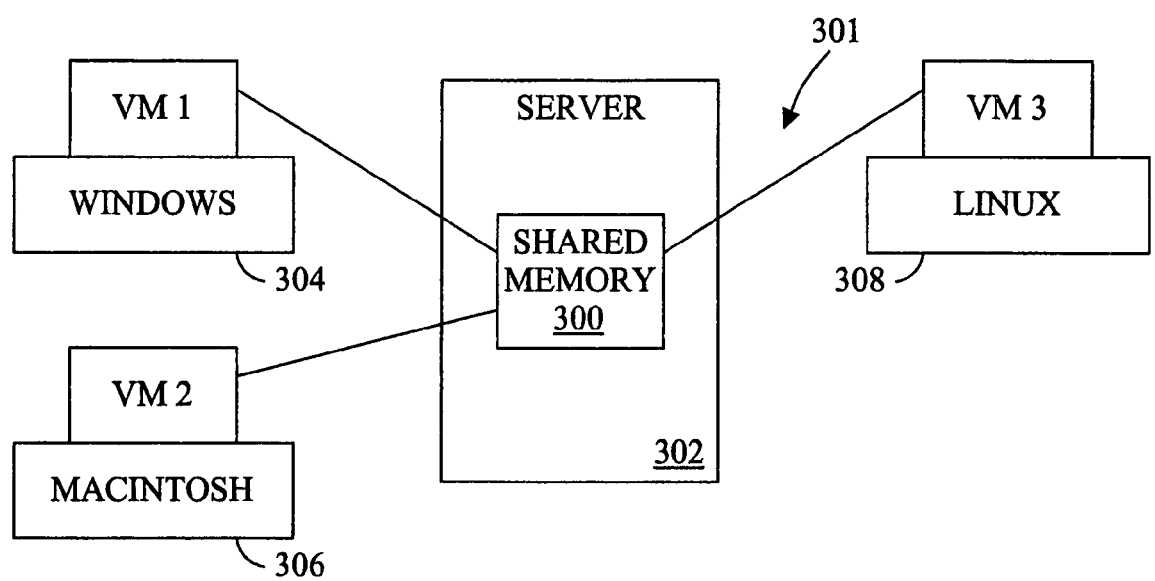
FIG. 9 is an improved system for the simultaneous operation of multiple instances of a VM application on several host computers connected through a network or internet server.

FIG. 9 shows another system 301 in which a shared object space 300 resides on a server 302 interconnecting independent computers 304, 306, 308 operating on the same or different platforms. Each computer 304, 306, and 308 is running a VM instance of a single application that reads and/or writes to data in a database on the server 302. For example, the server 302 may include a dynamic database for stock prices in a trading scenario where the connected computers 304, 306, and 308 may be used to complete stock transactions through the server using a uniform software package.

Oftentimes it is desirable to monitor an object space (i.e. monitoring the state of a memory space, objects in that space, or methods that use objects in that space) for statistical and other purposes. Two existing methods of monitoring an object space are typically employed. First, applications are programmed to periodically generate messages concerning the state of the objects they create, and these messages are then logged so that statistical data can be gathered relating to the use of those objects. This particular method adversely impacts performance, however, and takes up a large amount of disk and/or memory space; hence this method is typically used only for monitoring events that do not lend themselves to numeric representation. Alternatively, existing operating systems compile statistics used for monitoring an object space. These statistics, however, are chosen by the vendor of the operating system and cannot be easily customized.

Figure 10:
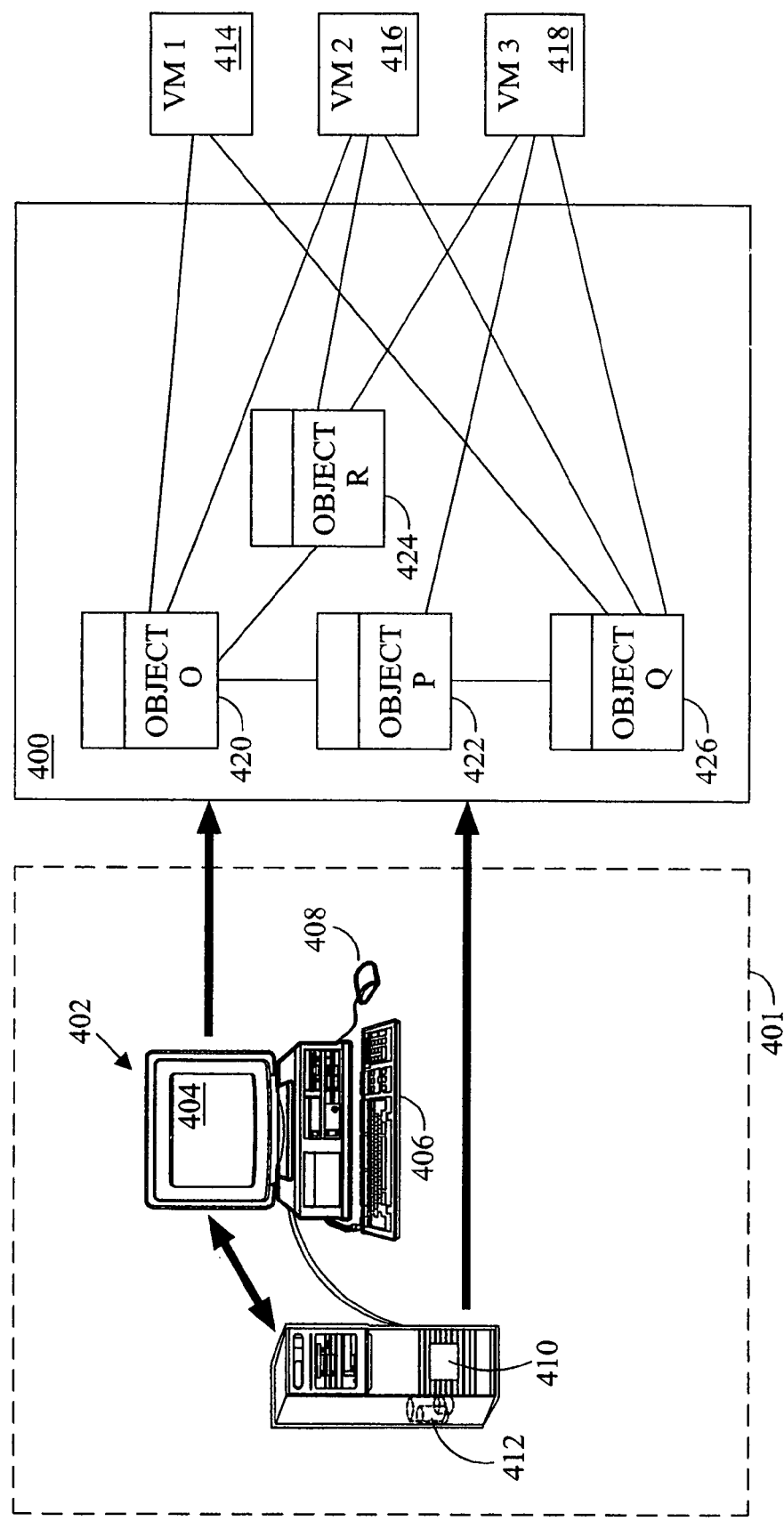
FIGS. 10 and 11 show a system for monitoring a shared object space to collect, store, graphically display, and analyze statistical or other data pertaining to the shared object space.

In contrast to these existing methods of monitoring an object space, the disclosed shared object space may be conveniently monitored using a minimal amount of system resources and may be easily customized to suit the needs of a particular user. Referring to FIG. 10, the disclosed system may include a console 402 having a display 404 and an interface such as the alphanumeric keyboard 406 and optionally a mouse 408. The console 402 may be operationally interconnected with an administrative processor 410 and disk storage 412. The console 402 in conjunction with the administrative processor 406 may be defined as an administrative system 401 and used to monitor a shared object space 400 by gathering statistics and providing access to the system and a user-defined event log, as well as monitoring shared object allocation rates, VM connections, lock acquisitions, shared queue sizes, and so on. The administrative system 401 may also be used to configure and initialize the shared object space 400 and permits an administrative user to dynamically discover which particular applications are utilizing the shared object space 400, such as the applications 414, 416, and 418 as well as to monitor system health, throughput, and other custom statistics enabled by the application data. The administrative system 401 also may provide automated alerts for serious problems so that the console 402 can be used to take corrective action.

The shared object space 400 may be associated with a distributed group management system having a distributed cache. In that instance, the administrative system 401 preferably uses administrative interfaces in the distributed group management system of the shared object space 400 to become an adjunct member of the cache. This allows the administrative system 402 to make requests in cache nodes, such as gathering a snapshot of current contents of a distributed cache region, taking corrective action on a deadlock alert, gathering statistics for graphing, or requesting log file contents for display.

The administrative system 401 preferably monitors the shared object space 400 so that any data or object, such as 420, 422, 424, or 426, in the shared object space 400 can be registered with the administrative system 401 for statistical monitoring and periodic backup to a compressed file on the disk storage 412. Preferably, the administrative system 401 takes a "snapshot" of all registered statistical data once every second and transfers that statistical data to the disk storage 412 where it can be analyzed later, even after the shared object space 400 no longer exists. A selected subset of the "snapshot" can also be simultaneously analyzed visually on the display 404. Alternatively, the frequency of the monitoring system may be adjustable so that a user can cause the administrative system to record statistical data more or less frequently than once per second.

The administrative system 401 preferably provides a framework for gathering application-defined statistics. For example, an application could identify any numeric field in a shared object class as a statistical field. The administrative system 401 may then immediately sample the field at designated intervals, log the results, and make the numbers available in a graphical tool on the display 404. For example, if object 424 shown in FIG. 10 as "object R" tracks the number of matches performed by a trading system matching engine, that object might be registered with the statistics service with the command GemFireConnectionFactory.getinstance( ).setStatisticsArchived(tradi-ngStats); after which the administrative system 401 will thereafter automatically record the state of "trading stats" for statistical review at a later time. The aforementioned registration command is, of course, merely an example of one particular command that could be used, and will vary from system to system depending on many factors including the programming language used, the name of the shared object space system, etc.

Figure 11:
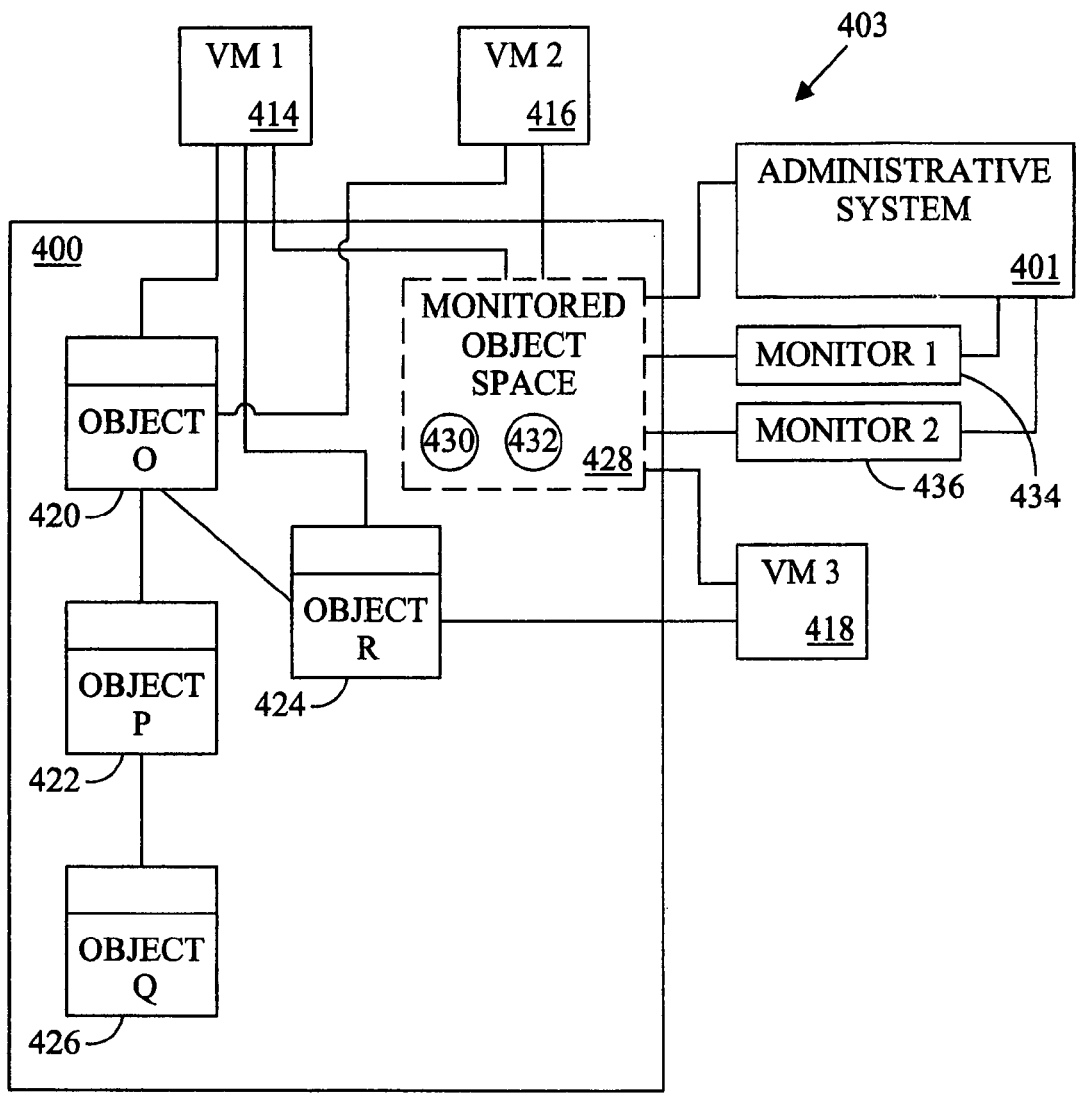

FIG. 11 is a simplified schematic of a system 403 for monitoring objects in a shared object space 400 where any application (such as applications 414, 416, and 418) including an administrative system 401 connected to the shared object space 400 may define what in the shared object space 400 is to be monitored. The system 403 includes a shared object space 400 that is being monitored by an administrative system 401 using two monitors 434 and 436. The number of monitors used may be varied as desired. The shared object space 400 includes a monitored object space 428 that selectively contains any desired number of objects to be monitored, such as the objects 420 and 432.

In operation, the applications 414, 416, and 418, as well as any other applications, including the administrative system 401, connected to the shared object space 400 may insert references to existing shared objects to be monitored into the monitored object space, such as the objects 430 and 432. The objects 430 and 432 are preferably simply references to shared objects, but in other embodiments may duplicate a shared object, such as 420, 422, 424, or 426, or may be a specific field in any of the shared objects in the shared object space 400, or alternatively may be customized to be data or fields of data that pertains in any way to the state of any shared object in the shared object space 400. An application may register an object to be monitored in the monitored object space in any desired manner, such as by making a single call with the object to be monitored as the only argument, inserting the registered monitored object, such as 430 or 432 into the monitored object space 428. The size, or capacity, of the monitored object space 428 may be any desired portion of the shared object space 400, and may be variable so as to expand or contract as necessary.

The monitors 434 and 436 each record the state of the data in the monitored object space 428 at a desired frequency. Preferably, the system 403 has a default frequency, such as once per second, which may be adjusted by a user or an application as necessary. The monitors 434 and 436, when directed by the administrative system 401, may store recorded snapshots of the data to storage local to the administrative system 401 for graphical display and analysis in the manner previously described.

As can be easily seen in reference to FIG. 11, the disclosed system for monitoring objects in a shared object space is highly flexible in that any application using the shared object space 400, or an administrative user, has the ability to define data that may be monitored or statistics to be compiled. This represents a tremendous advantage over existing systems, such as existing operating systems whereby the vendor of the operating system defined the set of statistics gathered, which could then either not be modified, or only modified after a great deal of effort.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A system for monitoring concurrent operation of plural computer applications, each said computer application operating in its own virtual machine, said system comprising:
   (a) a memory comprising a shared object space selectively connectable to each of said plural computer applications, said shared object space capable of storing at least one object accessible by each of said plural computer applications when connected to said shared object space and said shared object space further including a data structure that maintains references to stored objects in the shared object space that have been registered with the system by at least one of the computer applications in order to track how said registered objects are being used by said plural computer applications; and (b) a processing unit configured to periodically receive data from the shared object space, wherein said data relates to how said registered objects in the data structure are used by said plural computer applications.

2. The system of claim 1, wherein at least one of virtual machines in which the plural computer applications operate is a computing machine as defined by a Java Virtual Machine Specification.

3. The system of claim 1, further comprising a data store, wherein the processing unit is further configured to store the received data from the shared object space in the data store for future statistical analysis.

4. The system of claim 1, wherein the processing unit is further configured to receive requests from said plural computer applications to register objects stored in the shared object space for inclusion in the data structure.

5. The system of claim 1, wherein the processing unit is further configured to determine which of the plural computer applications are currently accessing the shared object space.

6. The system of claim 1, wherein the processing unit is further configured to adjust a frequency of receiving data from the shared object space.

7. The system of claim 1, wherein the processing unit is further configured to receive identification from said plural computer applications of specified data stored in the registered objects for which said plural computer applications desire to track.

8. The system of claim 1, wherein a heap memory of one of the virtual machines acts as the shared object space.

9. The system of claim 1, wherein the shared object space is implemented in a native environment of the system and the virtual machines access the shared object space through a native access layer.

10. The system of claim 1, wherein at least one object stored in the shared object space is a copy of an object stored in a local memory space of one of the computer applications.

11. The system of claim 10, wherein only said one of the computer applications can modify the at least one stored object and other computer applications can only copy the at least one stored object to their own local memory space.

12. The system of claim 1, wherein at least one object stored in the shared object space can be modified by each of the plural computer applications.

13. A method for monitoring concurrent operation of plural computer applications, each said computer application operating in its own virtual machine, said method comprising:
providing a shared object space in a memory, wherein the shared object space is selectively connectable to each of the plural computer applications and is capable of storing at least one object accessible by each of the plural computer applications when connected to the shared object space;
maintaining a data structure in the shared object space that maintains references to stored objects in the shared object space that have been registered by at least one of the computer applications in order to track how the registered objects are being used by the plural computer applications; and
periodically receiving data from the shared object space, wherein the data relates to how the registered objects in the data structure are used by the plural computer applications.

14. The method of claim 13, wherein at least one of virtual machines in which the plural computer applications operate is a computing machine as defined by a Java Virtual Machine Specification.

15. The method of claim 13, further comprising the step of storing the received data from the shared object space in a data store for future statistical analysis.

16. The method of claim 13, further comprising the step of receiving requests from the plural computer applications to register objects stored in the shared object space for inclusion in the data structure.

17. The method of claim 13, further comprising the step of determining which of the plural computer applications are currently accessing the shared object space.

18. The method of claim 13, further comprising the step of adjusting a frequency of receiving data from the shared object space.

19. The method of claim 13, further comprising the step of receiving identification from said plural computer applications of specified data stored in the registered objects for which said plural computer applications desire to track.

20. The method of claim 13, wherein a heap memory of one of the virtual machines acts as the shared object space.

21. The method of claim 13, wherein the shared object space is implemented in a native environment of the system and the virtual machines access the shared object space through a native access layer.

22. The method of claim 13, wherein at least one object stored in the shared object space is a copy of an object stored in a local memory space of one of the computer applications.

23. The method of claim 22, wherein only said one of the computer applications can modify the at least one stored object and other computer applications can only copy the at least one stored object to their own local memory space.

24. The method of claim 13, wherein at least one object stored in the shared object space can be modified by each of the plural computer applications.

25. A non-transitory computer-readable storage medium including instructions for monitoring concurrent operation of plural computer applications, each said computer application operating in its own virtual machine, said instructions, when executed on a processor, performing the steps of:
providing a shared object space in a memory, wherein the shared object space is selectively connectable to each of the plural computer applications and is capable of storing at least one object accessible by each of the plural computer applications when connected to the shared object space;
maintaining a data structure in the shared object space that maintains references to stored objects in the shared object space that have been registered by at least one of the computer applications in order to track how the registered objects are being used by the plural computer applications; and
periodically receiving data from the shared object space, wherein the data relates to how the registered objects in the data structure are used by the plural computer applications.

26. The non-transitory computer-readable storage medium of claim 25, wherein at least one of virtual machines in which the plural computer applications operate is a computing machine operable according to a Java Virtual Machine Specification.

27. The non-transitory computer-readable storage medium of claim 25, further comprising instructions that perform the step of storing the received data from the shared object space in a data store for future statistical analysis.

28. The non-transitory computer-readable storage medium of claim 25, further comprising instructions that perform the step of receiving requests from the plural computer applications to register objects stored in the shared object space for inclusion in the data structure.

29. The non-transitory computer-readable storage medium of claim 25, further comprising instructions that perform the step of determining which of the plural computer applications are currently accessing the shared object space.

30. The non-transitory computer-readable storage medium of claim 25, further comprising instructions that perform the step of adjusting a frequency of receiving data from the shared object space.

31. The non-transitory computer-readable storage medium of claim 25, further comprising instructions that perform the step of receiving identification from said plural computer applications of specified data stored in the registered objects for which said plural computer applications desire to track.

32. The non-transitory computer-readable storage medium of claim 25, wherein a heap memory of one of the virtual machines acts as the shared object space.

33. The non-transitory computer-readable storage medium of claim 25, wherein the shared object space is implemented in a native environment of the system and the virtual machines access the shared object space through a native access layer.

34. The non-transitory computer-readable storage medium of claim 25, wherein at least one object stored in the shared object space is a copy of an object stored in a local memory space of one of the computer applications.

35. The non-transitory computer-readable storage medium of claim 34, wherein at least one object stored in the shared object space can be modified by each of the plural computer applications.

36. The non-transitory computer-readable storage medium of claim 25, wherein at least one object stored in the shared object space can be modified by each of the plural computer applications.

* * * * *